US012801547B2

(12) United States Patent
Brueggen

(10) Patent No.: US 12,801,547 B2
(45) Date of Patent: Nov. 17, 2026

(54) ACCELERATED COMPUTATION OF DIRECT MEMORY ACCESS SCATTER CONTEXT FOR GET RESPONSE

(71) Applicant: Hewlett Packard Enterprise Development LP, Spring, TX (US)

(72) Inventor: Christopher M. Brueggen, Allen, TX (US)

(73) Assignee: Hewlett Packard Enterprise Development LP, Spring, TX (US)

(*) Notice: Subject to any disclaimer, the term of this patent is extended or adjusted under 35 U.S.C. 154(b) by 14 days.

(21) Appl. No.: 18/977,625

(22) Filed: Dec. 11, 2024

(65) Prior Publication Data

US 2026/0161584 A1 Jun. 11, 2026

(51) Int. Cl.
*G06F 13/28* (2006.01)
*G06F 15/80* (2006.01)

(52) U.S. Cl.
CPC .......... *G06F 13/28* (2013.01); *G06F 15/8069* (2013.01)

(58) Field of Classification Search
None
See application file for complete search history.

(56) References Cited

U.S. PATENT DOCUMENTS

| | | | | |
|---|---|---|---|---|
| 6,766,383 | B1 * | 7/2004 | Pan | G06F 13/28 709/212 |
| 6,907,036 | B1 * | 6/2005 | Malalur | H04L 49/90 709/212 |
| 7,424,556 | B1 * | 9/2008 | Spitzer | G06F 13/28 710/22 |
| 7,664,889 | B2 * | 2/2010 | Vemula | G06F 13/28 710/52 |
| 11,263,158 | B2 * | 3/2022 | Galles | G06F 9/30101 |
| 12,229,048 | B2 * | 2/2025 | Underwood | G06F 13/28 |
| 2024/0086064 | A1 * | 3/2024 | Wiegert | G06F 3/0604 |

* cited by examiner

*Primary Examiner* — Elias Mamo
(74) *Attorney, Agent, or Firm* — Yao Legal Services, Inc.

(57) ABSTRACT

A system receives an instruction corresponding to a Get request packet of a message and indicating a pattern type associated with direct memory access (DMA) write operations for the Get response. The system determines a descriptor and starting context associated with the Get request packet if the type of pattern indicates nested loops associated with a multi-dimensional array structure. The system stores the starting context in a hardware table, providing access to the starting context in response to processing a Get response packet corresponding to the Get request packet. The system processes the instruction in cycles until a byte count of bytes hypothetically transferred is equal to or greater than a size of the Get request payload. The system obtains an ending context comprising updated loop counters and byte offset and stores the ending context in a cache as the starting context for a next instruction of a same message.

18 Claims, 10 Drawing Sheets

200

| | ELEMENT 302 | DESCRIPTION 304 |
|---|---|---|
| 210 | stridez [31:0] | Stride value in z dimension |
| 212 | stridey [31:0] | Stride value in y dimension |
| 214 | stridex [31:0] | Stride value in x dimension |
| 216 | elementsz [15:0] | Total number of elements in z dimension |
| 218 | elementsy [15:0] | Total number of elements in y dimension |
| 220 | elementsx [15:0] | Total number of elements in x dimension |
| 222 | vb_last [7:0] | Number of valid bytes in the last element in the x dimension (may be different than vld_bytes) |
| 224 | vld_bytes [7:0] | Number of valid bytes in a data element when a byte mask is used |
| 226 | do_byte_masking | Indicates when byte-masking should be performed |
| 228 | last_partial | Indicates when the last element in the x dimension is a partial element |
| 230 | dsc_type | Set to 1, indicating Derived-DT formatted Descriptor |
| 232 | block_size [8:0] | Size of data element (max 256) |
| 234 | bs_last [7:0] | Size of last (partial) data element in x dimension (applicable if last_partial = 1) |
| 236 | length [39:0] | Total byte length of payload to be transferred (possibly in multiple packets) |
| 238 | address [63:0] | Base address of Context-FF array in host memory |

FIG. 2A

240

242
```
struct element {
   int a;
   float b;
   uint8_t c;
   double d;
};
struct element AoE[80][100][200];
int x, y, z;
```

244
```
//Send face yx
for(y=0; y < 100; y++)
  for(x=0; x< 200; x++) {
    send(AoE[0][y][x].b);
    send(AoE[0][y][x].d);
}
```

246
```
//Send face zy
for(z=0; z< 80; z++)
  for(y=0; y < 100; y++) {
    send(AoE[z][y][0].b);
    send(AoE[z][y][0].d);
}
```

248
```
//Send face zx
for(z=0; z< 80; z++)
  for(x=0; x< 200; x++) {
    send(AoE[z][0][x].b);
    send(AoE[z][0][x].d);
}
```

FIG. 2B

300

| Group | VARIABLE 352 | DESCRIPTION 354 |
|---|---|---|
| 360 | elementsx | From Descriptor: number of elements in x-dimension of the regular-pattern scatter (innermost nested loop). |
| 360 | elementsy | From Descriptor: number of elements in y-dimension of the regular-pattern scatter. |
| 360 | elementsz | From Descriptor: number of elements in z-dimension of the regular-pattern scatter. |
| 360 | byte_masked | From Descriptor: If 1, valid bytes in the data element are specified by a byte mask (data elements up to 256 bytes supported). If 0, the data element is contiguous. |
| 360 | last_partial | From Descriptor: If 1, the last element in the x-dimension is a partial element. |
| 360 | block_size | From Descriptor: extent of data element (may include non-valid bytes). |
| 360 | valid_bytes | From Descriptor: number of valid bytes in data element. |
| 360 | vb_last | From Descriptor: number of valid bytes in a last, partial, element in the x-dimension (if applicable). |
| 362 | currentx | Context: current loop counter value for x-dimension. |
| 362 | currenty | Context: current loop counter value for y-dimension. |
| 362 | currentz | Context: current loop counter value for z-dimension. |
| 362 | byteinblock | Context: if a data element is split across two packets, the byteinblock value will be non-zero at the start of the second packet, indicating the number of (valid) bytes of the data element that were carried in the first packet. |
| 362 | byte_cnt | Context: Number of packet payload bytes "transferred" so far by nested-loop execution. |
| 364 | Instr.length | Instruction: number of payload bytes in the Get response packet. |
| 366 | exec_done | Cleared at start of nested-loop execution, set when execution complete (for the given packet). |
| 368 | xjumpN | If TRUE, jump N iterations in the x-dimension, by adding N to currentx and increasing byte_cnt by the number of valid bytes in N data elements. |
| 368 | yjumpN | If TRUE, jump N iterations in the y-dimension, by adding N to currenty and increasing byte_cnt by the number of valid bytes in N data elements. |
| 368 | zjumpN | If TRUE, jump N iterations in the z-dimension, by adding N to currentz and increasing byte_cnt by the number of valid bytes in N data elements. |

FIG. 3A

380

```
381 { el_m_cur_x_gt256 =(elementsx-currentx) > 256;

382 { b_x256 =((elementsx<2 && last_partial) ? vb_last*256
        : byte_masked ? valid_bytes*256
          : block_size*256;

383 { b_x256_mbib_pbc = b_x256 - byteinblock + byte_cnt

384 { b_x256_mbib_pbc_ltil =b_x256_mbib_pbc < Instr.length

385 { xjump256 =el_m_cur_x_gt256 && b_x256_mbib_pbc_ltil
```

FIG. 3C

390

```
391 { b_x16 =((elementsx<2 && last_partial) ? vb_last*16
        : byte_masked ? valid_bytes*16
          : block_size*16;

392 { b_x16_mbib_pbc =b_x16 - byteinblock + byte_cnt

      currentx += 16

393 { byte_cnt += b_x16_mbib_pbc

394 { byteinblock = 0

395 { exec_done = 0
```

FIG. 3D

ACCELERATED COMPUTATION OF DIRECT MEMORY ACCESS SCATTER CONTEXT FOR GET RESPONSE

BACKGROUND

Field

A network interface card (NIC) can incorporate a direct memory access (DMA) engine for handling "scatter" operations (e.g., outbound write requests). A Get request message which requires a DMA scatter operation of the corresponding Get response payload may be transmitted across a network fabric as a series of request packets, each with a corresponding response packet. The DMA scatter operation may apply to the entire message, but the response packets may arrive out of order.

BRIEF DESCRIPTION OF THE FIGURES

FIG. 2A depicts a table illustrating an exemplary Derived-Datatype descriptor, in accordance with an aspect of the present application.

FIG. 2B depicts an exemplary Derived-Datatype used in a DMA scatter operation, in accordance with an aspect of the present application.

FIG. 3A depicts a table 300 indicating a description of the variables used in the operations and pseudocode of FIGS. 3B-D, in accordance with an aspect of the present application.

FIG. 3C presents pseudocode illustrating a method which facilitates determining whether to jump a certain number of iterations in a particular dimension (e.g., in a loop of the nested loops), in accordance with an aspect of the present application.

FIG. 3D presents pseudocode illustrating a method which facilitates updating the context on a jump of a certain number of iterations in a particular dimension (e.g., in a loop of the nested loops), in accordance with an aspect of the present application.

In the figures, like reference numerals refer to the same figure elements.

DETAILED DESCRIPTION

Figure 1:
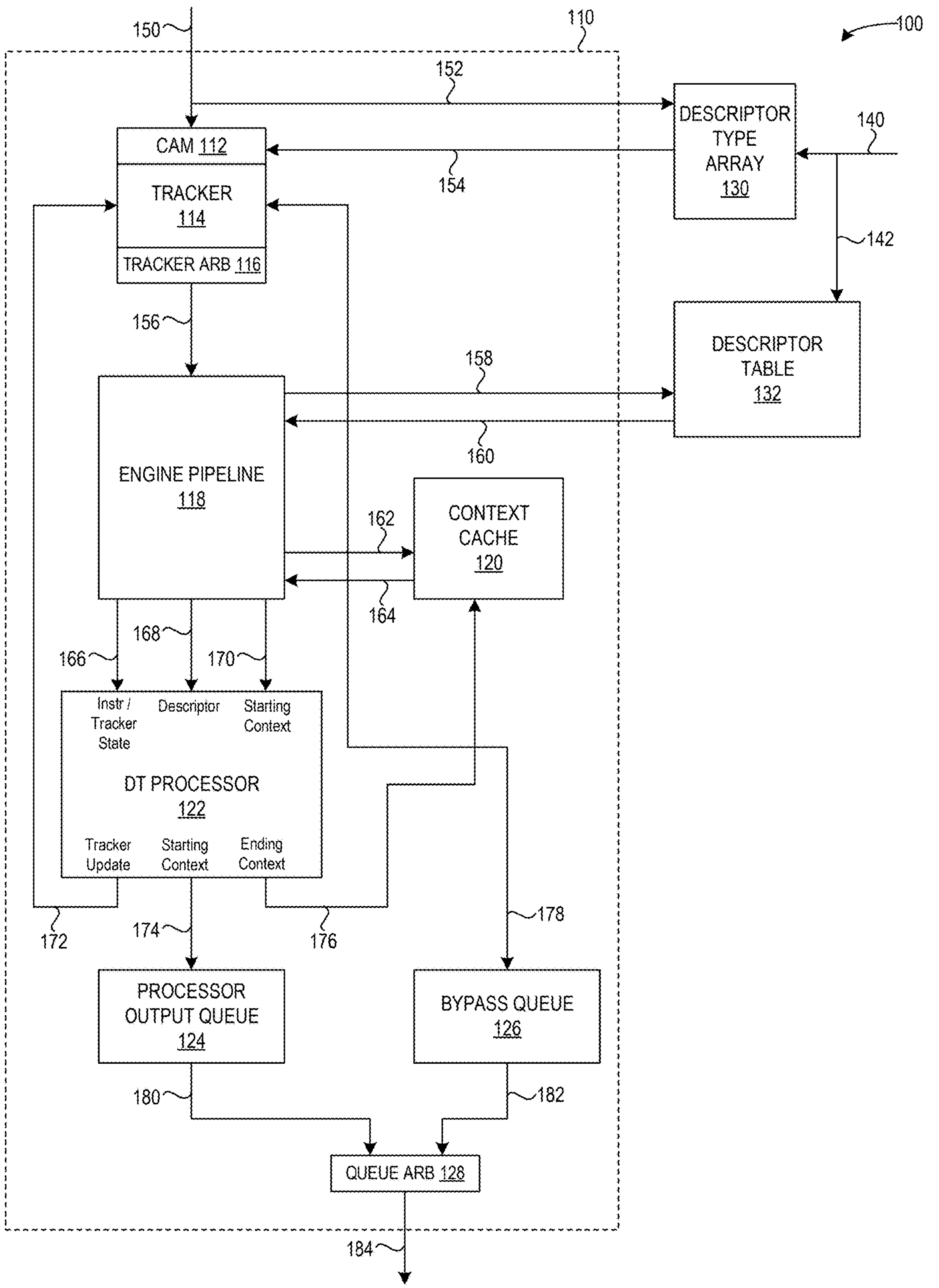
FIG. 1 illustrates a diagram of an architecture which facilitates accelerated computation of a DMA scatter context for a Get response, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

The described aspects provide a system which addresses the efficiency of handling a DMA scatter operation as part of a Get response by precomputing the starting context as each corresponding Get request packet is issued.

As described above, a NIC may include a specific DMA engine for handling scatter operations (referred to as the "DMA scatter engine" or the "DMA engine"), e.g., to accelerate the transfer of "message" payload from and to a host memory. A "message" may be a piece of information transferred across the network as one or more packets (e.g., Ethernet frames with Transfer Control Protocol/Internet Protocol (TCP/IP) packets, a proprietary transport packet, etc.).

The NIC may receive Get response packets in response to previously transmitted Get request packets. That is, a Get request message which requires a DMA scatter operation of the corresponding Get response payload may be transmitted across a network fabric as a series of Get request packets ("request packet"), and each Get request packet may correspond to a Get response packet ("response packet"). While the DMA scatter operation may apply to the entire message, the response packets may arrive out of order.

In order to efficiently and accurately process each incoming response packet, the DMA engine can precompute the starting context for each response packet when the corresponding request packet is issued, and the DMA engine can store that starting context while awaiting the response packet. One type of DMA scatter operation may be based on a "Derived Datatype" (D-DT), which can be used to address a multi-dimensional array structure (e.g., processing one or more nested "for" loops) associated with the number of elements in each dimension, the size of a block to be transferred, and the stride in each dimension. A D-DT scatter operation may also be referred to as a "regular-pattern scatter." The starting context for a D-DT may include the loop counter values and a "byteinblock" value (also referred to herein as a "byte offset"). When one of the scatter data elements is split across two response packets, the second of those two response packets can have a starting context with a non-zero "byteinblock" value, which indicates how many bytes of the data element pointed to by the loop counter values are carried in the first packet. The remaining bytes of the data element may be known to be carried in the second packet.

The DMA scatter operation may also be based on an input/output vector datatype (IOVEC-DT), in which case the response payload can be written to a number of non-contiguous, variable-sized memory buffers. The IOVEC may define the memory buffers and can be a memory structure containing an array of address-length pairs which determine how the message data is arranged in host memory.

In addition to supporting the D-DT scatter operation and the IOVEC scatter operation, the DMA engine can also support operations that do not involve a scatter operation ("no-scatter operation"). Computing the starting context for a D-DT scatter operation is described below in relation to FIGS. 1, 3A-C, and 4A-B. Computing the starting context for an IOVEC scatter operation and a no-scatter operation is described below in relation to FIG. 1.

FIG. 1 illustrates a diagram 100 of an architecture which facilitates accelerated computation of a DMA scatter context for a Get response, in accordance with an aspect of the present application. Diagram 100 includes a DMA scatter engine (also referred to as "DMA engine" or "engine") 110 which interacts with various components external to the engine. Engine 110 may be part of circuitry or logic in a NIC which can perform the operations described herein. Engine 110 may include: a tracker 114 and an associated content addressable memory (CAM) 112 and a tracker arbitrator ("Arb") 116 which handles scheduling for the processing of incoming instructions to the engine; a DMA engine pipeline 118 (also referred to as the "engine pipeline") which gathers information from various units or components in and external to the engine; a datatype processor (DTP) 122 which receives inputs (e.g., from engine pipeline 118) and performs the methods described herein, including the accelerated computation of starting context for Get responses; a context cache 120 which caches starting contexts which are output as ending contexts by DTP 122 based on an associated access or storage time; a processor output queue 124 for storing, e.g., a starting context output by DTP 122; a bypass queue 126 for storing, e.g., instructions that are not associated with a D-DT scatter operation; and a queue arbitrator ("Arb") 128 which handles scheduling for processing of data from processor output queue 124 and bypass queue 126.

A Descriptor type array 130 and a Descriptor table 132 may be populated based on communications from entities external to engine 110 (e.g., via, respectively, communications 140 and 142). Descriptor table 132 may be a software-programmable table local to a specific DMA scatter/gather engine or may be shared among multiple engines. Prior to initiating a scatter/gather operation, software must program a datatype Descriptor (e.g., Derived-DT or IOVEC-DT) in descriptor table 132, which defines the organization of the message payload in host memory. In the described aspects, Descriptor table 132 may include entries which define a unique DMA scatter operation (e.g., a D-DT scatter or an IOVEC scatter). Each instruction which is input to engine 110 (e.g., via a communication 150) may carry a datatype (DT) handle which is a reference to (i.e., points to) an entry in descriptor table 132. If the DT handle has a NULL value, then the instruction is associated with a no-scatter DMA operation. Descriptor type array 130 can include an array of bits which correspond in parallel to Descriptor table 132, i.e., one bit in Descriptor type array 130 corresponds to one entry in Descriptor table 132. The bit may indicate whether the corresponding table entry defines a D-DT scatter (e.g., a value of 1) or an IOVEC-scatter (e.g., a value of 0).

During operation, engine 110 may receive instructions via communication 150 and store the incoming instructions in tracker 114, e.g., a 256-entry tracker data structure. Engine 110 may receive a new instruction (via communication 150). Based on information indicated in the new instruction, engine 110 can look up the Descriptor type bit to determine whether the new instruction is associated with a no-scatter operation, a D-DT scatter operation, or an IOVEC scatter operation (indicated respectively by, e.g., a null value, a value of 1, or a value of 0). CAM 112 can perform an operation to compare the new instruction with instructions which already exist in tracker 114. Engine 110 can use information from the new instruction to obtain the value of the Descriptor bit from Descriptor type array 130 (via communications 152 and 154). If the Descriptor type bit indicates a D-DT scatter operation, engine 110 can enforce in-order processing of same-message instructions by creating a linked-list per message via fields in a tracker entry. If the Descriptor type bit indicates a no-scatter operation or an IOVEC scatter operation, tracker 114 can store those instructions in independent tracker entries to be immediately processed (e.g., sent via a communication 178 to bypass queue 126).

Tracker arbitrator 116 may perform arbitration among all tracker entries that are currently ready for processing. If a tracker entry that wins arbitration does not require a D-DT scatter operation, engine 110 can form the starting context immediately (e.g., based on a message offset value carried in the input instruction) and transmit that starting context to bypass queue 126 (via communication 178). Tracker arbitrator 116 can subsequently free the tracker entry. Starting contexts in bypass queue 126 may arbitrate for write access to a hardware table in which all starting contexts for Get response packets are stored. Queue arbitrator 128 may perform arbitration among starting contexts stored in both processor output queue 124 (described below) (obtained via a communication 180) and bypass queue 126 (obtained via a communication 182). Queue arbitrator 128 may subsequently transmit the winning starting context to be stored in the hardware table (via a communication 184). The hardware table may be in a Sideband random access memory (RAM) accessible to other engines running in the NIC or network device.

In general, tracker entries that do not require a D-DT scatter operation may be stored almost immediately after the instruction is input into engine 110, and the occupancy time of that tracker entry may be small.

If a tracker entry that wins arbitration does require a D-DT scatter operation, that information can be input to engine pipeline 118 (via a communication 156). Engine pipeline 118 can read the Descriptor from Descriptor table 132 (via communications 158 and 160) and can also read the current context (if present) from context cache 120 (via communications 162 and 164). Engine pipeline 118 can input to DTP 122 at least the following information: instruction and tracker state (via a communication 166); the Descriptor as obtained from Descriptor table 132 (via a communication 168); and the starting context as either obtained from context cache 120 or created as a new starting context (via a communication 170).

Engine pipeline 118 may obtain the starting context from context cache 120, if a starting context for a prior Get request packet of the same message has already been stored in context cache 120. Determining whether the starting context should be newly created or should exist in context cache 120 can be based on whether a "start of message" indicator is set in the new Get request instruction. If the "start of message" indicator is set, then no starting context for that Get request packet will be stored in context cache 120, indicating that this packet of the new Get request instruction is the first packet of the message to be processed and further indicating that a new context must be created. If the "start of message" indicator is not set, then a starting context for that Get request packet will be stored in context cache 120. The starting context created by engine 110 or stored in context cache 120 can include loop counter values and a "byteinblock" value which is applicable when one of the scatter data elements is split across two Get response packets (e.g., the "byteinblock" value in the starting context for the second such Get Response packet can be non-zero and can indicate how many bytes of the data element are carried in the first packet). The "byteinblock" value is also referred to as a "byte offset" associated with iterating through the nested loops, e.g., in the specific situation where one of the scatter data elements is split across two Get responses packets, as described above. The starting context input into DTP 122 (via communication 170), whether obtained from context cache 120 or created by engine pipeline 118 or DTP 122, can be output, along with the DT handle and a packet handle, by DTP 122 to processor output queue 124 (via a communication 174).

Subsequent to outputting the starting context (via communication 174), DTP 122 can perform a "dry-run" execution of the nested loops that define the D-DT scatter operation. For example, DTP 122 may use the initial loop counter values provided in the starting context (as obtained from either context cache 120 or created as a new starting context by DTP 122) and iterate through the nested loops. DTP 122 can keep track of the amount ("byte count" or "byte_cnt") of the payload of the packet which is hypothetically transferred with each iteration. DTP 122 can continue this processing (e.g., the hypothetical transfer) until the byte count is equal to or greater than the amount of payload carried in the corresponding Get response packet. When this condition is reached, DTP 122 can store the final loop-execution context as "ending context" in context cache 120 (via a communication 176), and the processing of the new instruction may be considered as complete. Tracker 114 can free the tracker entry managing that instruction (based on tracker update information received from DTP 122 via a communication 172). Tracker 114 can also mark the following instruction of the same message (if present) as ready for processing.

As described above, queue arbitrator 128 may perform arbitration among: starting contexts stored via communication 174 in processor output queue 124 and obtained by queue arbitrator 128 via communication 180; and starting contexts stored via communication 178 in bypass queue 126 and obtained by queue arbitrator 128 via communication 182. Thus, the starting context output by DTP 122 (via communication 174) can be stored in the hardware table (via communication 184). That starting context stored in the hardware table may be subsequently attached to a Get response packet corresponding to the previously transmitted Get request packet (from which the starting context was computed by DTP 122 and stored in the hardware table). The starting context may thus be used when processing the DMA scatter operation of the packet payload for corresponding Get response packets.

As described below in relation to FIGS. 3A-C, when precomputing the starting context while processing a Get request packet, the system can perform an accelerated dry-run execution of the iterations of the nested loops in a fewer number of hardware clock cycles than the number of iterations in the nested loops that would need to be performed when processing a corresponding Get response packet. As a result, the described aspects can result in more efficient communications and operations.

FIG. 2A depicts a table 200 illustrating an exemplary Derived-DT descriptor, in accordance with an aspect of the present application. Table 200 includes entries 210-238 indicating the names of elements (202) of the Derived-DT descriptor along with a respective description (204) for each element. For example, entry 230 indicates that if the element "dsc_type" is set to a value of "1," this may represent a Derived-DT formatted descriptor. As another example, an entry 226 for the element "do_byte_masking" indicates whether byte-masking is to be performed. If this element is set to a value of "1" (or another value that indicates that byte-masking is to be performed), the descriptor table (e.g., descriptor table 122 in FIG. 1) may store a 256-bit byte-mask in parallel with the descriptor. Table 200 is reproduced below:

| | ELEMENT 202 | DESCRIPTION 204 |
|---|---|---|
| 210{ | stridez [31:0] | Stride value in z dimension |
| 212{ | stridey [31:0] | Stride value in y dimension |
| 214{ | stridex [31:0] | Stride value in x dimension |
| 216{ | elementsz [15:0] | Total number of elements in z dimension |
| 218{ | elementsy [15:0] | Total number of elements in y dimension |
| 220{ | elementsx [15:0] | Total number of elements in x dimension |
| 222{ | vb_last [7:0] | Number of valid bytes in the last element in the x dimension (may be different than vld_bytes) |
| 224{ | vld_bytes [7:0] | Number of valid bytes in a data element when a byte mask is used |
| 226{ | do_byte_masking | Indicates when byte-masking should be performed |
| 228{ | last_partial | Indicates when the last element in the x dimension is a partial element |
| 230{ | dsc_type | Set to 1, indicating Derived-DT formatted Descriptor |
| 232{ | block_size [8:0] | Size of data element (max 256) |
| 234{ | bs_last [7:0] | Size of last (partial) data element in x dimension (applicable if last_partial = 1) |
| 236{ | length [39:0] | Total byte length of payload to be transferred (possibly in multiple packets) |
| 238{ | address [63:0] | Base address of Context-FF array in host memory |

FIG. 2B depicts an exemplary Derived-Datatype 240 used in a DMA scatter operation, in accordance with an aspect of the present application. A section 242 may provide definitions for Derived-DT 240, including: a data structure named "element" with four values as indicated; and a data structure named "AoE" as an array of "elements," including a number of elements in three dimensions (e.g., x=200, y=100, and x=80), indicating that three dimensions of strides are supported. For each element in the array, the element size may be up to, e.g., 256 bytes, which may be consistent with the size of common data structures in current applications. Other smaller or larger element sizes may be used. Each of sections 244, 246 and 248 indicates that for a particular "face" (e.g., across two of the three dimensions), only certain subcomponents of the elements are to be selected. A byte-mask for each element may be supported to select individual bytes to send. In Derived-DT 240, the byte-mask may select the "b" and "d" subcomponents of the element. Exemplary derived-DT 240 is reproduced below:

242

```
struct element {
   int a;
   float b;
   uint8_t c;
   double d;
};
struct element AoE[80][100][200];
int x, y, z;
//Send face yx
for(y=0; y < 100; y++)
```

-continued

| | |
|---|---|
| 244 | for(x=0; x< 200; x++) {<br>send(AoE[0][y][x].b);<br>send(AoE[0][y][x].d);<br>} |
| | //Send face zy |
| 246 | for(z=0; z< 80; z++)<br>for(y=0; y < 100; y++) {<br>send(AoE[z][y][0].b);<br>send(AoE[z][y][0].d);<br>} |
| | //Send face zx |
| 248 | for(z=0; z< 80; z++)<br>for(x=0; x< 200; x++) {<br>send(AoE[z][0][x].b);<br>send(AoE[z][0][x].d);<br>} |

"byte_cnt," which indicates the current number of packet payload bytes hypothetically transferred by the nested-loop execution. Section 364 includes an entry for the variable "Instr.length," which indicates a number of payload bytes in the Get response packet. Section 366 includes an entry for the variable "exec_done," which is cleared at the start of nested-loop execution and set when execution for a given packet is complete (as described below in relation to, respectively, operations 344 and 346 in FIG. 3B). Section 368 includes variables used to determine whether to jump a certain number of iterations during the dry-run execution, e.g., if "xjumpN" evaluates to TRUE, this indicates to jump N iterations in the x-dimension, by adding N to current and by increasing byte_cnt by the number of valid bytes in N data elements, as described below in relation to, e.g., decision 312 of FIG. 3B. Table 300 is reproduced below:

| | VARIABLE 352 | DESCRIPTION 354 |
|---|---|---|
| 360 | elementsx | From Descriptor: number of elements in x-dimension of the regular-pattern scatter (innermost nested loop). |
| | elementsy | From Descriptor: number of elements in y-dimension of the regular-pattern scatter. |
| | elementsz | From Descriptor: number of elements in z-dimension of the regular-pattern scatter. |
| | byte_masked | From Descriptor: If 1, valid bytes in the data element are specified by a byte mask (data elements up to 256 bytes supported). If 0, the data element is contiguous. |
| | last_partial | From Descriptor: If 1, the last element in the x-dimension is a partial element. |
| | block_size | From Descriptor: extent of data element (may include non-valid bytes). |
| | valid_bytes | From Descriptor: number of valid bytes in data element. |
| | vb_last | From Descriptor: number of valid bytes in a last, partial, element in the x-dimension (if applicable). |
| 362 | currentx | Context: current loop counter value for x-dimension. |
| | currenty | Context: current loop counter value for y-dimension. |
| | currentz | Context: current loop counter value for z-dimension. |
| | byteinblock | Context: if a data element is split across two packets, the byteinblock value will be non-zero at the start of the second packet, indicating the number of (valid) bytes of the data element that were carried in the first packet. |
| | byte_cnt | Context: Number of packet payload bytes "transferred" so far by nested-loop execution. |
| 364{ | Instr.length | Instruction: number of payload bytes in the Get response packet. |
| 366{ | exec_done | Cleared at start of nested-loop execution, set when execution complete (for the given packet). |
| 368 | xjumpN | If TRUE, jump N iterations in the x-dimension, by adding N to currentx and increasing byte_cnt by the number of valid bytes in N data elements. |
| | yjumpN | If TRUE, jump N iterations in the y-dimension, by adding N to currenty and increasing byte_cnt by the number of valid bytes in N data elements. |
| | zjumpN | If TRUE, jump N iterations in the z-dimension, by adding N to currentz and increasing byte_cnt by the number of valid bytes in N data elements. |

Figure 3B:
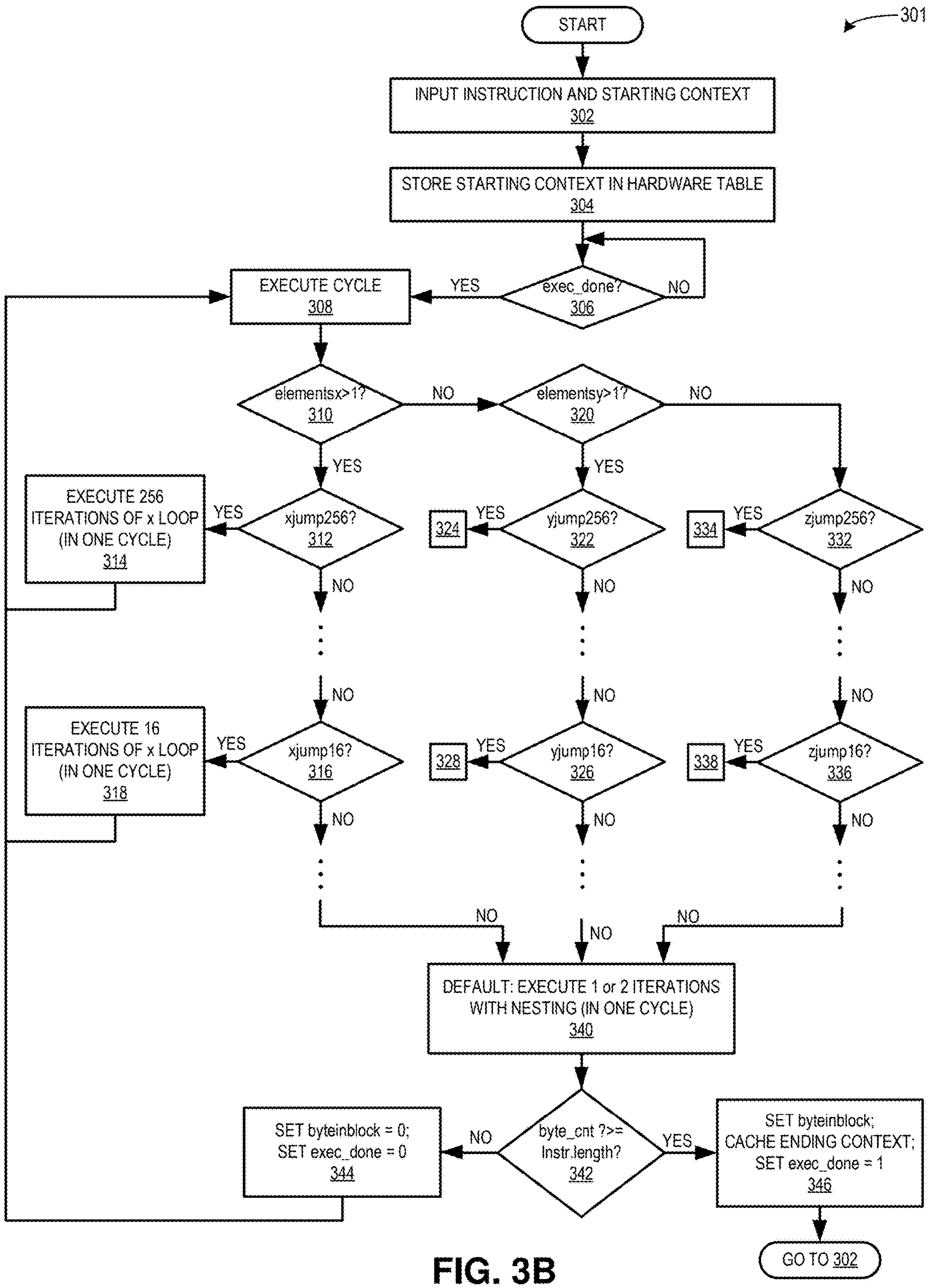
FIG. 3B presents a flowchart illustrating a method by a processor which facilitates an accelerated dry-run execution for a Derived-Datatype used in a DMA scatter operation, in accordance with an aspect of the present application.

FIG. 3A depicts a table 300 indicating a description of the variables used in the operations and pseudocode of FIGS. 3B-D, in accordance with an aspect of the present application. Table 300 includes entries in sections 360-368 indicating the variables (352) along with a respective description (354) for each variable. For example, section 360 includes variables indicated in the Descriptor, such as: "elementsx," which indicates the number of elements in the x-dimension of the regular-pattern scatter (i.e., D-DT scatter); "byte_masked," which indicates whether a byte mask is specified for the bytes in the data element; etc. Section 362 includes variables indicated in the Context, such as: "currentx," which indicates the current loop counter values for the x-dimension; "byteinblock," which indicates a non-zero value if a data element is split across two packets; and FIG. 3B presents a flowchart 301 illustrating a method by a processor which facilitates an accelerated dry-run execution for a Derived-Datatype used in a DMA scatter operation, in accordance with an aspect of the present application. During operation, as depicted in flowchart 301, the DT processor (DTP) of a NIC receives as input the instruction and the starting context (operation 302) as well as the Descriptor, as described above in relation to DTP 122 receiving inputs from communications 166, 168, and 170 in FIG. 1. The DTP stores the starting context in a hardware table, e.g., in a Sideband RAM accessible to other engines running in the NIC, as described above in relation to communications 170, 174, 180, and 184 in FIG. 1.

The DT processor can include a hardware function which continually examines the current point of execution within the nested loops with respect to the next packet payload boundary. The DTP can perform a dry-run execution by "hypothetically transferring" packet payload or opportunistically "jumping ahead" a variable number of iterations. This dry-run execution may involve far fewer hardware clock cycles than the actual number of nested loop iterations. The DTP determines if the execution of the current instruction (packet) is complete based on the variable "exec_done," which is cleared at the start of the nested-loop execution and set when the execution is complete for the given packet (decision 306). If the execution of the current instruction is not complete (i.e., exec_done=0) (decision 306), the DTP waits (e.g., by returning to decision 306). If the execution of the current instruction is complete (i.e., exec_done=1) (decision 306), the DTP proceeds to execute the cycle (e.g., performs an "EXEC_CYCLE" function) (operation 308).

If the number of elements in the x-dimension of the D-DT scatter (the innermost nested loop, labeled as "elementsx") is greater than 1 (decision 310), the DTP determines whether a predetermined number of iterations can be performed in a respective loop of the nested loops. The pseudocode in FIG. 3C below depicts how to make this determination.

FIG. 3C presents pseudocode 380 illustrating a method which facilitates determining whether to jump a certain number of iterations in a particular dimension (e.g., in a loop of the nested loops), in accordance with an aspect of the present application. Pseudocode 380 is reproduced below:

results in the number of valid bytes per data element being defined by "valid_bytes" rather than "block_size." Second, the last (and potentially only) data element in the x-dimension may be a partial element. If there is a single element in the x-dimension, no jumps greater than one iteration may be possible in the x-dimension. However, a jump of 256 may be possible in the y-dimension, and the "(elementsx<2 && last_partial)? vb_last*256 . . . " portion of the calculation for "b_x256" in PC 382 can account for 256 partial data elements when calculating yjump256 (or zjump256, if applicable). Third, in the first execution cycle, the "byteinblock" value may be non-zero, because part of a data element may have been "hypothetically transferred in a previous packet." As a result, the remaining portion of the element is being "transferred in this packet" (as indicated by PC 383).

Finally, the calculation for xjump256 can be based on both the determination of whether there are at least 256 iterations remaining in the x-dimension (i.e., "el_m_cur_x_gt256," as in PC 381) and whether 256 x-dimension data elements can be "transferred" without the total number of valid bytes exceeding the packet payload size (and accounting for bye-masked data elements, partial data elements, and non-zero byteinblock values in a first execution cycle) (i.e., "b_x256_mbib_pbc_ltil," as in PC 382, 383, 384, and 385).

```
381  {  el_m_cur_x_gt256 =(elementsx−currentx) > 256;
        b_x256 =((elementsx<2 && last_partial) ? vb_last*256
382  {     : byte_masked ? valid_bytes*256
              : block_size*256;
383  {  b_x256_mbib_pbc = b_x256 − byteinblock + byte_cnt
384  {  b_x256_mbib_pbc_ltil =b_x256_mbib_pbc < Instr.length
385  {  xjump256 =el_m_cur_x_gt256 && b_x256_mbib_pbc_ltil
```

Pseudocode 380 provides an example of how "xjump256" may be calculated (i.e., whether to jump 256 iterations in the x-dimension). The equivalent pseudocode for a jump of N in the y-dimension or z-dimension may generally be inferred from pseudocode 380. For a jump of N, the pseudocode would scale by N rather than 256, and variable names would contain "xN" rather than "x256."

If N is the predetermined number of iterations, and N is a power of 2, "xjumpN" may be, e.g., "xjump256," "xjump128," "xjump64," "xjump32," "xjump16," or "xjump4." In decision 312, the DT processor may calculate "xjump256." A jump of 256 iterations in the x-dimension may be performed based on two calculations: (1) "el_m_cur_x_gt256==1," indicating that there are at least 256 iterations remaining in the x-dimension (as depicted by PC 381); and (2) "b_x256_mbib_pbc_ltil==1," indicating that 256 x-dimension data elements may be "hypothetically transferred" without the total number of bytes transferred (i.e., "byte_cnt") exceeding the packet payload size (i.e., "Instr.length") (as indicated by PC 382, 383, and 384).

For the y-dimension, the first pseudocode calculation would be: "el_m_cur_y_gtN=(elementsy-currenty)>N," and for the z-dimension, the first pseudocode calculation would be: "el_m_cur_z_gtN=(elementsz-currentz)>N" (similar to the first pseudocode calculation 381 for the x-dimension). However, the "b_xN" calculation (as in pseudocode 382) always refers to "elementsx" because it accounts for the scenario of a single partial data element in the x-dimension, as described below in relation to the several factors in relation to calculation (2).

Several factors may be considered in relation to calculation (2). First, data elements may be byte-masked, which If xjump256 is true (decision 312), the DT processor executes 256 iterations of the x-dimension loop (in one cycle) (operation 314), e.g., jumps 256 iterations in the x-dimension by adding 256 to "currentx" (the current loop counter value for the x-dimension in the context) and increasing "byte_cnt" (the running number of packet payload bytes hypothetically transferred by executing the nested loop) by the number of valid bytes in 256 data elements. Operation 314 illustrates an example of executing N iterations of the x-dimension loop. Further detail is provided below in relation to operation 318 (where N is 16 in the x-dimension).

When operation 314 is complete, the operation returns to operation 308, where the same decisions are executed. If the number of elements in the x-dimension of the D-DT scatter (labeled as "elementsx") is greater than 1 (decision 310), the DT processor determines whether a predetermined number of iterations can be performed in a respective loop of the nested loops. If xjump256 continues to be true (decision 312), the DTP again executes 256 iterations of the x-loop (in one cycle) (operation 314).

If xjump256 is not true (decision 312), the DT Processor moves to increasingly smaller jump sizes (values of N) and performs the same decisions and operations for each value of N as for when N was 256 (as in decision 312 and operation 314). As another example, the DTP may calculate and determine that "xjump16" is true (decision 316) and may execute 16 iterations of the x-dimension loop (in one cycle) (operation 318), e.g., jump 16 iterations in the x-dimension by adding 16 to "currentx" (the current loop counter value for the x-dimension in the context) and increasing "byte_cnt" (the running number of packet payload bytes hypothetically transferred by executing the nested loop) by the number of valid bytes in 16 data elements. The pseudocode in FIG. 3D below depicts how to perform this execution.

FIG. 3D presents pseudocode 390 illustrating a method which facilitates updating the context on a jump of a certain number of iterations in a particular dimension (e.g., in a loop of the nested loops), in accordance with an aspect of the present application. Pseudocode 390 is reproduced below:

```
        b__x16 =((elementsx < 2 && last__partial) ? vb__last*16
391       : byte__masked ? valid__bytes*16
            : block__size*16;
392     b__x16__mbib__pbc = b__x16 − byteinblock + byte__cnt

        currentx + = 16
393   { byte__cnt + = b__x16__mbib__pbc
394   { byteinblock = 0
395   { exec__done = 0
```

Pseudocode 390 provides an example of how to update the context on a jump of 16 iterations in the x-dimension (i.e., operation 318). The equivalent pseudocode for updating the context on a jump of N in the y-dimension or z-dimension may generally be inferred from pseudocode 390. Again, however, the "b_xN" calculation (as in pseudocode 391) always refers to "elementsx" because it accounts for the scenario of a single partial data element in the x-dimension, as described above in relation to the several factors in relation to calculation (2).

The DT processor can calculate the number of valid bytes "transferred" in 16 data elements, accounting for byte-masked data elements and the scenario with a single partial element in the x-dimension (by calculating "b_x16," as indicated by PC 391). The DTP can also determine the value by which the "byte_cnt" value will be increased, accounting for "byteinblock" which may be non-zero in the first execution cycle (by calculating "b_x16_mbib_pbc," as indicated by the first line of PC 392). The DTP can increase the current loop counter value for the x-dimension by 16 (as indicated by the second line of PC 392) and can also increase the byte count by the number of bytes transferred (as indicated by PC 393). The values of "byteinblock" and "exec_done" may be set to 0 (as indicated by PC 394 and 395).

When operation 318 is complete, the operation returns to operation 308, where the same decisions are executed. If the number of elements in the x-dimension of the D-DT scatter (labeled as "elementsx") is greater than 1 (decision 310), the DTP determines whether a predetermined number of iterations can be performed in a respective loop of the nested loops. If xjump16 continues to be true (decision 316), the DTP again executes 16 iterations of the x-loop (in one cycle) (operation 318).

If xjump16 is not true (decision 316), the DTP moves to increasingly smaller jump sizes (values of N) and performs the same decisions and operations for each value of N as for when N was 16 (as in decision 316 and operation 318).

If no jumps of greater than two iterations are possible, execution moves to a "default" operation to execute one or two iterations with nesting (in one cycle) (operation 340), in the respective dimension. By default, up to two iterations of the overall nested loop may be executed in a single cycle, and all context (e.g., context*, "byte_cnt," and "byteinblock") will be updated after each such iteration. After each iteration, the DT processor compares "byte_cnt" with "Instr.length." If "byte_cnt" is not equal to or greater than "Instr.length" (decision 342), the DTP sets both "byteinblock" and "exec_done" to zero, and the execution of the cycle continues at operation 308.

If "byte_cnt" is equal to or greater than "Instr.length" (decision 342), this indicates that the final data element has been "transferred." If "byte_cnt" is strictly greater than "Instr.length," this indicates that only a portion of the final data element can fit within the packet payload. In this case, the DT processor may assign "byteinblock" a non-zero value (operation 346), which indicates the number of valid bytes of the data element that were "transferred." The remaining valid bytes of that (split) data element may be accounted for when processing the following packet of the same message. The DTP may cache the ending context (which is to be used as the starting context for execution of the next same-message instruction) and may also set "exec_done" to a value of one (indicating that execution of a new instruction or starting context may begin) (operation 346), and the operation may continue at operation 302.

The DT processor may continue through similar decisions and operations for each dimension. For example, if the number of elements in the x-dimension of the D-DT scatter (labeled as "elementsx") is not greater than 1 (decision 310), the DTP moves on to the next loop or dimension (the y-dimension). If the number of elements in the y-dimension of the D-DT scatter (labeled as "elementsy") is greater than 1 (decision 320), the DTP determines whether a predetermined number N of iterations can be performed in a respective loop of the nested loops in the y-dimension and performs the execution of that predetermined number N of iterations, following a decrease in N similar to the decisions and operations described above for the x-dimension.

Similarly, if the number of elements in the y-dimension of the D-DT scatter (labeled as "elementsy") is not greater than 1 (decision 310), the DT processor moves on to the next loop or dimension (the z-dimension) and determines whether a predetermined number N of iterations can be performed in a respective loop of the nested loops in the z-dimension and performs the execution of that predetermined number N of iterations, following a decrease in N similar to the decisions and operations described above for the x-dimension. Decision 322 and operation 324 in the y-dimension and decision 332 and operation 334 in the z-dimension correspond to decision 312 and operation 314 in the x-dimension. Similarly, decision 326 and operation 328 in the y-dimension and decision 336 and operation 338 in the z-dimension correspond to decision 316 and operation 318 in the x-dimension.

Figure 4A:
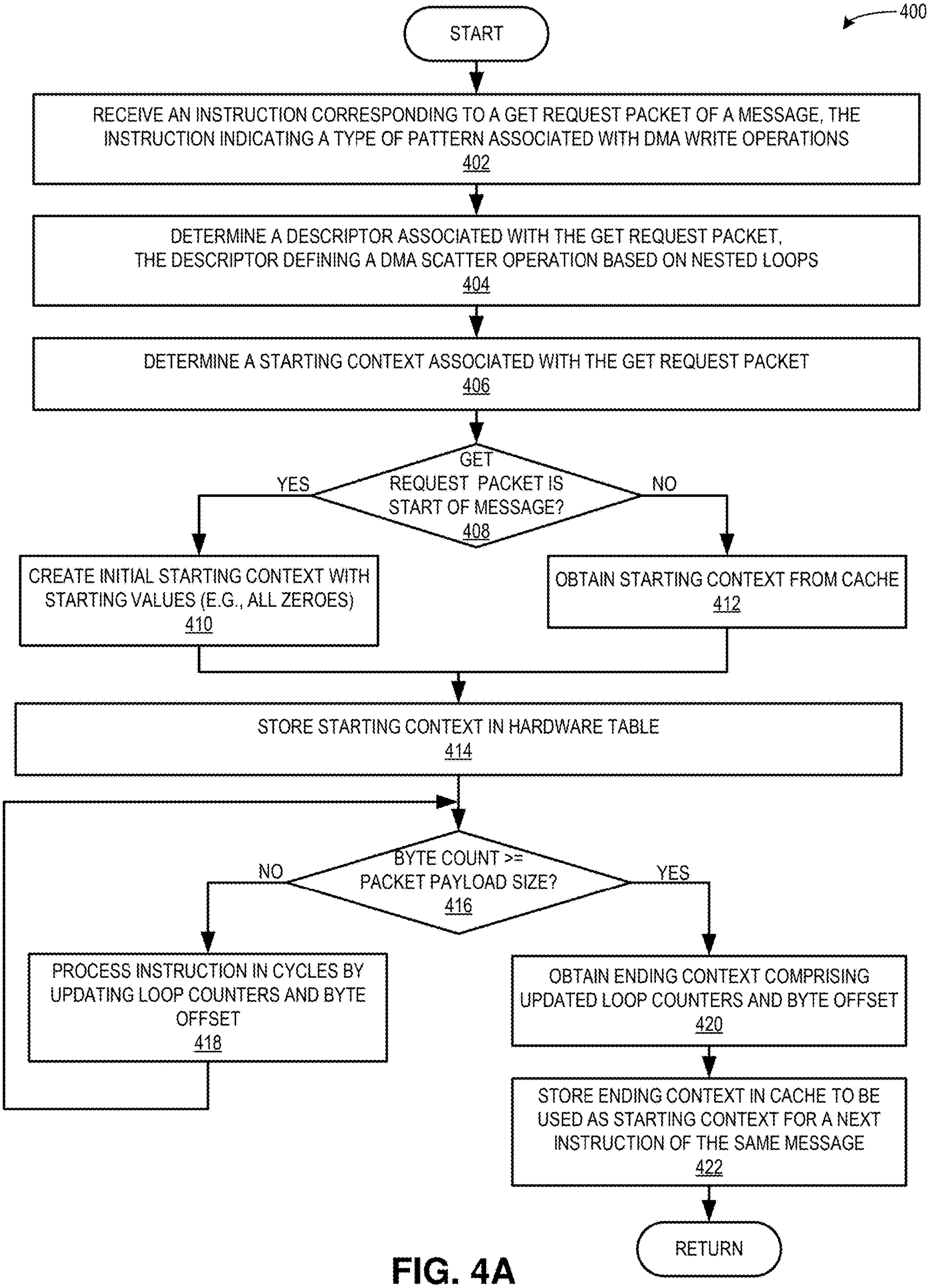
FIG. 4A presents a flowchart illustrating a method which facilitates accelerated computation of a DMA scatter context for a Get response, in accordance with an aspect of the present application.

FIG. 4A presents a flowchart 400 illustrating a method 400 which facilitates accelerated computation of a DMA scatter context for a Get response, in accordance with an aspect of the present application. The system receives an instruction corresponding to a Get request packet of a message, the instruction indicating a type of pattern associated with direct memory access (DMA) write operations (operation 402). For example, as depicted in FIG. 1, engine 110 may receive an instruction 150 which may indicate a descriptor associated with a Derived-DT (a "regular-pattern scatter") or an IOVEC-DT (an "IOVEC scatter"). The pattern type may indicate a Derived-DT, which may result in operations 404 and 406 below.

The system determines a descriptor associated with the Get request packet, the descriptor defining a DMA scatter operation based on the nested loops (operation 404). For example, as described above in relation to instruction 150 of FIG. 1, based on information (e.g., a handle value) indicated in instruction 150, engine 110 can look up the Descriptor type bit to determine whether instruction 150 is associated with a no-scatter operation, a D-DT scatter operation, or an IOVEC scatter operation (indicated respectively by, e.g., a null handle value, a Descriptor type value of 1, or a Descriptor type value of 0).

The system determines a starting context associated with the Get request packet (operation 406). The instruction (or Get request packet) may include a "start of message" indicator. If the "start of message" indicator is set, then no starting context for that Get request packet will be stored in a context cache (e.g., context cache 120 as in FIG. 1), indicating that this packet of the new Get request instruction is the first packet of the message to be processed and further indicating that a new context must be created. If the "start of message" indicator is not set, then a starting context for that Get request packet will be stored in the context cache (e.g., context cache 120 as in FIG. 1).

If the Get request packet is the start of the message (decision 408), the system creates an initial starting context with starting values (e.g., all zeroes) (operation 410), as described above in relation to instruction 150 and starting context 170 of FIG. 1.

If the Get request packet is not the start of the message (decision 408), the system obtains the starting context from the cache (operation 412), as described above in relation to instruction 150 and communications 162/164 of FIG. 1. The starting context created by engine 110 or stored in context cache 120 can include loop counter values and a "byteinblock" value which is applicable when one of the scatter data elements is split across two Get response packets. The byteinblock value is also referred to as a "byte offset" associated with iterating through the nested loops.

The system stores the starting context in a hardware table (operation 414), which provides subsequent access to the starting context in response to processing a Get response packet corresponding to the Get request packet. For example, DTP 122 may receive the starting context from engine pipeline 118 (via communication 170) and may output the starting context to processor output queue 124 (via communication 174) for eventual selection and forwarding by queue arbitrator 128 to be stored in the hardware table (via communication 184). The hardware table may be a Sideband RAM accessible to other engines running in the NIC or network device.

If the byte count is not equal to or greater than a size of a payload associated with the Get request packet (decision 416), the system processes the instruction in cycles by updating loop counters and a byte offset (i.e., "byteinblock") associated with iterating through the nested loops (operation 418) and continues to iterate through the nested loops until decision 416 yields a positive result. For example, the system may process the instruction in cycles by iterating through the nested loops based on the operations and decisions (such as "xjump256" and "Execute 16 iterations . . . ") described above in relation to FIG. 3B and the pseudocode of FIGS. 3C and 3D. Decision 416 may correspond to decision 342 in FIG. 3B.

If the byte count is equal to or greater than a size of a payload associated with the Get request packet (decision 416), the system obtains, based on the processed instruction, an ending context comprising the updated loop counters and byte offset (operation 420), similar to operation 346 in FIG. 3B.

The system stores the ending context in a cache as the starting context for a next instruction of a same message (operation 422). For example, after computing the ending context, DTP 122 in engine 110 may store the ending context in context cache 120 (via communication 176), and that stored ending context may be subsequently used as the starting context for a next instruction of the same message (e.g., to become the starting context as obtained from context cache 120 when the "start of message" indicator does not indicate an instruction corresponding to the start of the message).

In addition, subsequent to operation 402, if the type of pattern indicated in the instruction indicates an IOVEC-DT, the system refrains from storing the context and refrains from processing the instructions in cycles. Instead, the system may create and send the IOVEC-scatter starting context to a bypass queue (e.g., from tracker 114 via a communication 178 to bypass queue 126 in FIG. 1).

The operation returns, e.g., back to operation 402 to continue processing additional received instructions.

Figure 4B:
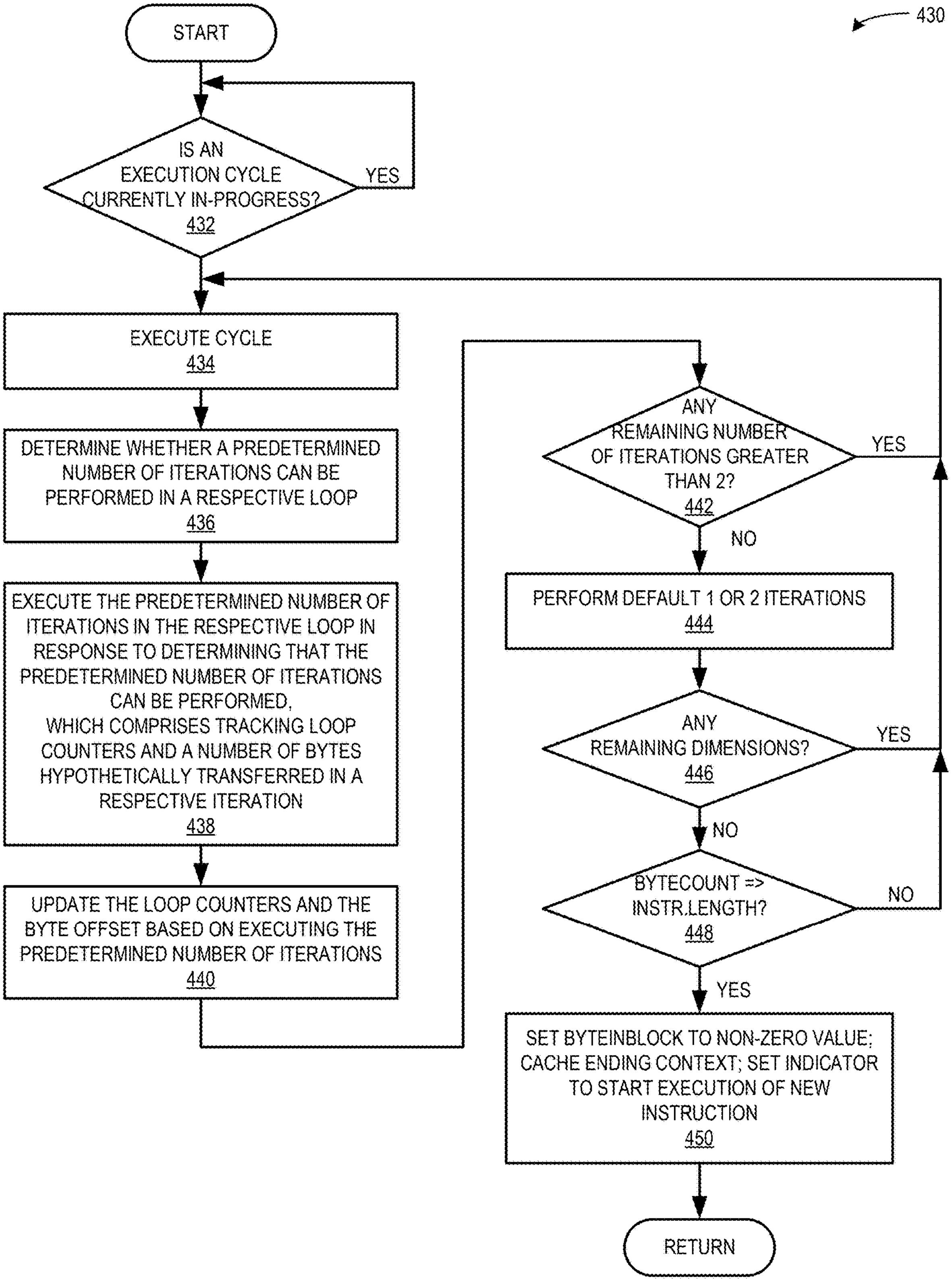
FIG. 4B presents a flowchart illustrating a method which facilitates accelerated computation of a DMA scatter context for a Get response, including processing instructions in cycles as part of an accelerated dry-run execution, in accordance with an aspect of the present application.

FIG. 4B presents a flowchart 430 illustrating a method which facilitates accelerated computation of a DMA scatter context for a Get response, including processing instructions in cycles as part of an accelerated dry-run execution, in accordance with an aspect of the present application. The system can receive an instruction which is eventually input to a DT processor. If an execution cycle is currently in progress (decision 432), the system waits and continues the execution status of the cycle until the execution cycle is no longer currently in progress.

If the execution cycle is not currently in progress (or no longer currently in progress) (decision 432), the system executes the cycle (operation 434), which can be a cycle for a next instruction. The system may determine that the current number of elements in a respective dimension (e.g., starting with the innermost loop of the x-dimension) is greater than one and continue to operation 436, as described above in relation to decisions 310 and 320 in FIG. 3B. The system may move to a next loop until it has performed the iterations for each respective dimension, e.g., the y-dimension and the z-dimension, when the current number of elements in the respective dimension is not greater than one.

The system determines whether a predetermined number of iterations can be performed in a respective loop (operation 436). For example, the system may determine whether the predetermined number of iterations can be performed in a respective loop based on at least one of: the predetermined number or more of iterations remaining in the respective loop; processing the predetermined number of elements in the respective loop in response to the byte count not exceeding the size of the payload associated with the Get request packet; whether the data elements in the respective loop are byte-masked; or whether the final data element in the respective loop is a partial element (as described above in relation to, e.g., xjump256 in PC 380 of FIG. 3C).

The system executes the predetermined number of iterations in the respective loop in response to determining that the predetermined number of iterations can be performed, which comprises tracking a number of bytes hypothetically transferred in a respective iteration (operation 438). For example, in FIG. 3B, if xjump256 is true, the system may execute 256 iterations of the x-dimension loop (in one cycle), as in decision 312 and operation 314. The execution may include jumping 256 iterations in the x-dimension by adding 256 to "currentx" (the current loop counter value for the x-dimension in the context) and increasing "byte_cnt" (the running number of packet payload bytes hypothetically transferred by executing the nested loop) by the number of valid bytes in 256 data elements.

The system updates the loop counters and the byte offset (i.e., "byteinblock") based on executing the predetermined number of iterations (operation 440). In operation 318 for xjump16 (which is similar to operation 314 for xjump256), the system may jump 16 iterations in the x-dimension by adding 16 to "currentx" (the current loop counter value for the x-dimension in the context) and increasing "byte_cnt" (the running number of packet payload bytes hypothetically transferred by executing the nested loop) by the number of valid bytes in 16 data elements, as described above in relation to FIGS. 3B and 3D.

If there are any remaining number of iterations less than a previously used predetermined number and greater than two (decision 442), the operation returns to operation 434 to continue executing the cycle. The predetermined number (referred to in some aspects as N) is described above in relation to FIGS. 3A-D as numbers which are a power of two, such as decreasing numbers 256, 128, 64, 32, 16, 4, etc. If there is no remaining predetermined number of iterations greater than two (decision 442), the system performs the default one or two iterations (operation 444), as described above in relation to operation 340 of FIG. 3B.

If there are any remaining dimensions to be processed (i.e., loops to be iterated through) (decision 446), the operation returns to operation 434 to continue executing the cycle. For example, if the remaining number of elements in the current loop (e.g., x-dimension based on the value of "elementsx") is no longer greater than 1, the DTP may continue processing by moving to the next dimension or loop (e.g., y-dimension based on the value of "elementsy"), as described above in relation to decisions 310 and 320 of FIG. 3B. If there are no remaining dimensions to be processed (decision 446), the system compares the current byte count (i.e., "byte_cnt," the running total of total bytes hypothetically transferred) to the size of the packet payload (i.e., "Instr.length," the length of the instruction), as described above in relation to decision 342 of FIG. 3B.

If the byte count is not equal to or greater than the size of the payload (decision 448), the system sets the byte offset (i.e., "byteinblock") to a value of zero (not shown in FIG. 4B) and the operation returns to operation 434 to continue executing the cycle.

If the byte count is equal to or greater than the size of the payload (decision 448), the system sets the "byteinblock" to a non-zero value, caches the ending context (e.g., the updated loop counters and the byte offset), and sets an indicator to start execution of a new instruction (operation 450). For example, the system may set a value of a flag or bit which is subsequently checked to determine the result of decision 432. The operation returns. In some aspects, the operation may return to decision 432 after operation 450.

Figure 5:
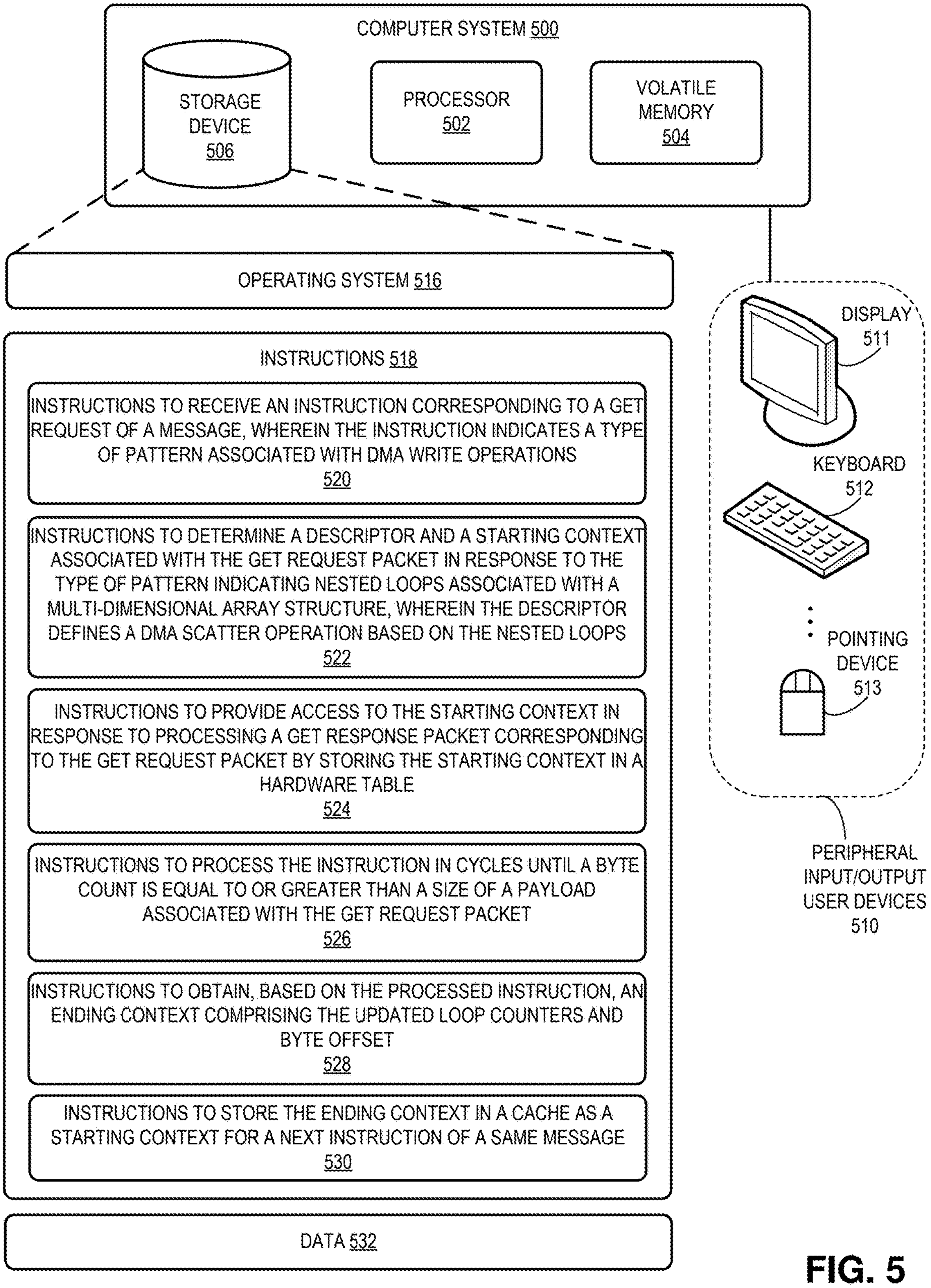
FIG. 5 illustrates a computer system which facilitates accelerated computation of a DMA scatter context for a Get response, in accordance with an aspect of the present application.

FIG. 5 illustrates a computer system 500 which facilitates accelerated computation of a DMA scatter context for a Get response, in accordance with an aspect of the present application. Computer system 500 includes a processor 502, a memory 504, and a storage device 506. Memory 504 may include a volatile memory (e.g., random access memory (RAM)) that serves as a managed memory and can be used to store one or more memory pools. Furthermore, computer system 500 may be coupled to peripheral I/O user devices 510 (e.g., a display device 511, a keyboard 512, and a pointing device 513). Storage device 506 includes non-transitory computer-readable storage medium and stores an operating system 516, instructions 518, and data 532. Computer system 500 may be a network device 500 with at least one processing resource (e.g., 502) and circuitry (including modules, units, components, etc. in hardware, software, or a combination of hardware and software, e.g., 506). In network device 500, the circuitry or storage device may store instructions which when executed by the at least one processing resource (e.g., 502) comprises instructions to perform the operations described herein. Computer system 500 may include fewer or more entities or instructions than those shown in FIG. 5.

Instructions 518 can include instructions, which when executed by computer system 500, can cause computer system 500 to perform methods and/or processes described in this disclosure. Specifically, instructions 518 may include instructions 520 to receive an instruction corresponding to a Get request packet of a message, wherein the instruction indicates a type of pattern associated with DMA write operations, as described above in relation to instruction 150 of FIG. 1 and operation 402 of FIG. 4A.

Instructions 518 may include instructions 522 to determine a descriptor and a starting context associated with the Get request packet in response to the type of pattern indicating nested loops associated with a multi-dimensional array structure, wherein the descriptor defines a direct memory access (DMA) scatter operation based on the nested loops, as described above in relation to instruction 150, communications 152/154, 158/160, 162/164, 168, and 170 of FIG. 1 as well as operations 404 and 406 of FIG. 4A.

Instructions 518 may include instructions 524 to provide access to the starting context in response to processing a Get response packet corresponding to the Get request packet by storing the starting context in a hardware table, as described above in relation to output 184 in FIG. 1 and operation 408 in FIG. 4A.

Instructions 518 may include instructions 526 to process the instruction in cycles until a byte count is equal to or greater than a size of a payload associated with the Get request packet, wherein the byte count comprises a number of bytes hypothetically transferred while processing the instruction and wherein processing the instruction in cycles comprises updating loop counters and a byte offset associated with iterating through the nested loops. Processing the instruction in cycles is described above in relation to FIG. 3B and the pseudocode of FIGS. 3C and 3D as well as in further detail in relation to FIG. 4B. Processing the instruction in cycles may include executing a predetermined number of iterations of a respective loop, as described above in relation to decisions 312/316 and operations 314/318 of FIG. 3B. Processing the instruction in cycles may also include updating the starting context, i.e., the loop counters and the byte offset ("byteinblock"), as described above in relation to operation 440 of FIG. 4B.

Instructions 518 may include instructions 528 to obtain, based on the processed instruction, an ending context comprising the updated loop counters and byte offset, as described above in relation to DTP 122 of FIG. 1, the computations of FIG. 3B, and operations 440 and 450 of FIG. 4B.

Instructions 518 may include instructions 530 to store the ending context in a cache as the starting context for a next instruction of a same message, as described above in relation to communication 176 of FIG. 1, operation 346 of FIG. 3B, and operation 450 of FIG. 4B.

Instructions 518 may include more instructions than those shown in FIG. 5. For example, instructions 518 may include instructions for executing the operations described above in relation to: the architecture of FIG. 1; the communications, operations, and pseudocode of FIGS. 3A-D; the operations depicted in the flowcharts of FIGS. 4A and 4B; and the instructions of CRM 600 in FIG. 6.

Data 532 can include any data that is required as input or that is generated as output by the methods, operations, communications, and/or processes described in this disclosure. Specifically, data 532 can store at least: an instruction;

an instruction corresponding to a Get request packet of a message; a message; an indicator of a type of pattern; a pattern type associated with DMA write operations; a descriptor; a context; a starting context; an ending context; an indicator of nested loops associated with a multi-dimensional array structure; a Get response packet; a value of a loop counter; a byte offset; a processed instruction; a byte count; a number of bytes hypothetically transferred while processing an instruction; a size of a payload; a number of elements; a number of dimensions; a size of a block to be transferred; a stride in a dimension; a reference to an IOVEC; an indicator of sending an instruction to a bypass queue; a software-programmed table; an initial starting context; an indicator of whether a packet is a first or subsequent packet of a message; one or more predetermined numbers of iterations; an indicator of whether data elements in a respective loop are byte-masked; a byte mask; a vector; a vector of bits; and a number of hardware clock cycles.

Figure 6:
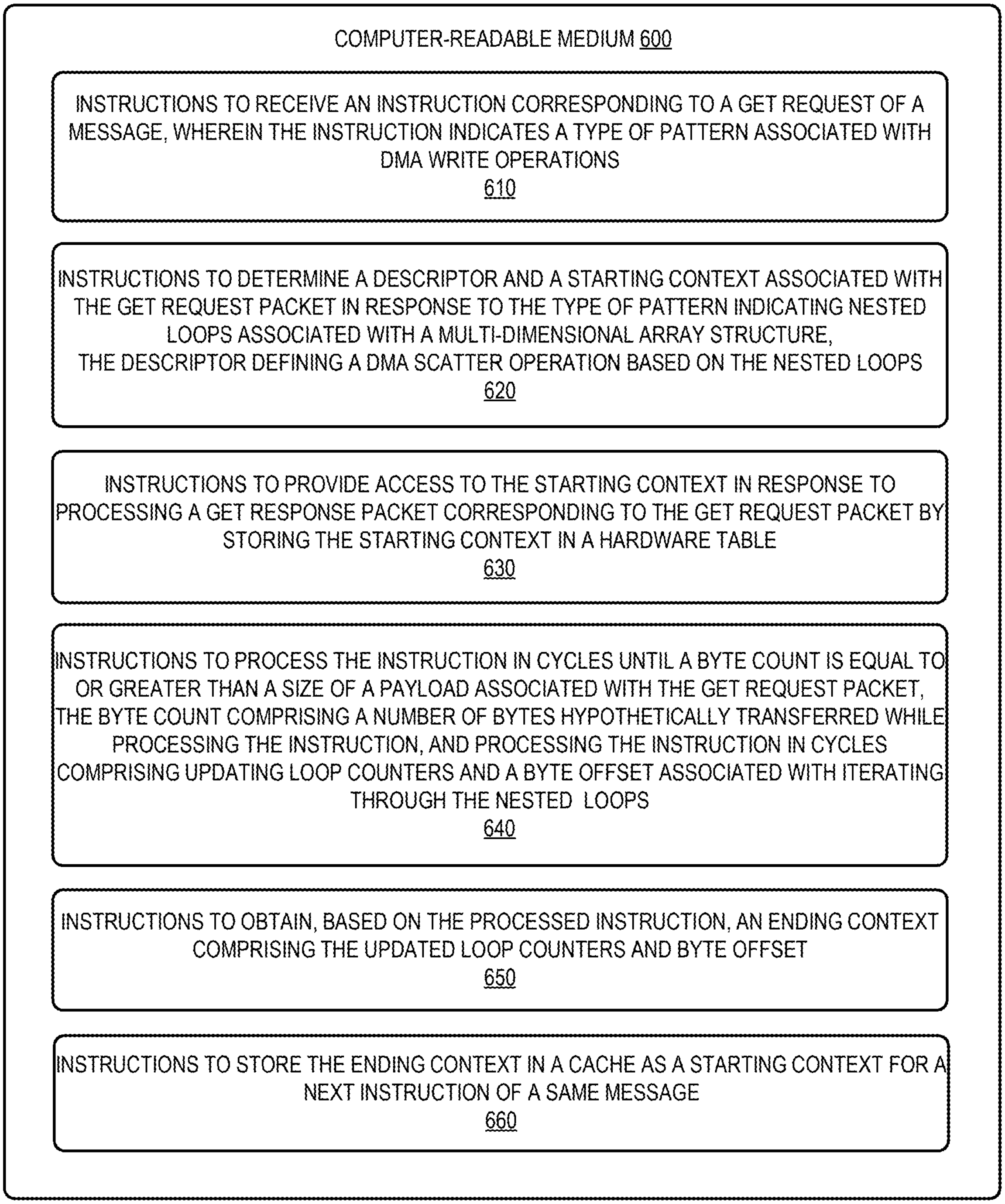
FIG. 6 illustrates a computer-readable medium which facilitates accelerated computation of a DMA scatter context for a Get response, in accordance with an aspect of the present application.

FIG. 6 illustrates a computer-readable medium 600 which facilitates accelerated computation of a DMA scatter context for a Get response, in accordance with an aspect of the present application. CRM 600 can be a non-transitory computer-readable medium or device storing instructions that when executed by a computer or processor cause the computer or processor to perform a method, including the methods and operations described herein.

CRM 600 may store instructions 610 to receive an instruction corresponding to a Get request packet of a message, the instruction indicating a type of pattern associated with direct memory access (DMA) write operations, as described above in relation to instruction 150 of FIG. 1 and operation 402 of FIG. 4A.

CRM 600 may store instructions 620 to determine a descriptor and a starting context associated with the Get request packet in response to the type of pattern indicating nested loops associated with a multi-dimensional array structure, the descriptor defining a direct memory access (DMA) scatter operation based on the nested loops, as described above in relation to instruction 150, communications 152/154, 158/160, 162/164, 168, and 170 of FIG. 1 as well as operations 404 and 406 of FIG. 4A.

CRM 600 may store instructions 630 to provide access to the starting context in response to processing a Get response packet corresponding to the Get request packet by storing the starting context in a hardware table, as described above in relation to output 184 in FIG. 1 and operation 408 in FIG. 4A.

CRM 600 may store instructions 640 to process the instruction in cycles until a byte count is equal to or greater than a size of a payload associated with the Get request packet, the byte count comprising a number of bytes hypothetically transferred while processing the instruction, and processing the instruction in cycles comprising updating loop counters and a byte offset associated with iterating through the nested loops. Processing the instruction in cycles may include executing a predetermined number of iterations of a respective loop, as described above in relation to decisions 312/316 and operations 314/318 of FIG. 3B. Processing the instruction in cycles may also include updating the starting context, i.e., the loop counters and the byte offset ("byteinblock"), as described above in relation to operation 440 of FIG. 4B.

CRM 600 may store instructions 650 to obtain, based on the processed instruction, an ending context comprising the updated loop counters and byte offset, as described above in relation to DTP 122 of FIG. 1, the computations of FIG. 3B, and operations 440 and 450 of FIG. 4B.

CRM 600 may store instructions 660 to store the ending context in a cache as the starting context for a next instruction of a same message, as described above in relation to communication 176 of FIG. 1, operation 346 of FIG. 3B, and operation 450 of FIG. 4B.

CRM 600 may include more instructions than those shown in FIG. 6. For example, CRM 600 may also store instructions to execute the operations described above in relation to: the architecture of FIG. 1; the communications, operations, and pseudocode of FIGS. 3A-D; the operations depicted in the flowcharts of FIGS. 4A and 4B; and the instructions of computer system 500 in FIG. 5.

In general, the disclosed aspects provide a method, network device (or computer system), and non-transitory computer-readable storage medium which facilitates accelerated computation of a DMA scatter context for a Get response. In one aspect, the system receives an instruction corresponding to a Get request packet of a message, the instruction indicating a type of pattern associated with direct memory access (DMA) write operations. The system determines a descriptor and a starting context associated with the Get request packet in response to the type of pattern indicating nested loops associated with a multi-dimensional array structure, the descriptor defining a DMA scatter operation based on the nested loops. The system provides access to the starting context in response to processing a Get response packet corresponding to the Get request packet by storing the starting context in a hardware table. The system processes the instruction in cycles until a byte count is equal to or greater than a size of a payload associated with the Get request packet, the byte count comprising a number of bytes hypothetically transferred while processing the instruction, and processing the instruction in cycles comprising updating loop counters and a byte offset associated with iterating through the nested loops. The system obtains, based on the processed instruction, an ending context comprising the updated loop counters and byte offset. The system stores the ending context in a cache as the starting context for a next instruction of a same message.

In a variation on this aspect, the multi-dimensional array structure is associated with a number of elements in each dimension, a size of a block to be transferred, and a stride in each dimension.

In a further variation on this aspect, the system determines that the type of pattern is associated with a reference to an input/output vector (IOVEC) with entries indicating addresses and lengths of data associated with the host memory. The system refrains from storing the context and refraining from processing the instruction in cycles in response to the type of pattern being associated with the reference to the IOVEC. The system creates and sends the starting context to a bypass queue for subsequent forwarding.

In a further variation on this aspect, the system determines the descriptor by obtaining the descriptor from a software-programmed table, a respective entry in the software-programmed table defining a DMA scatter operation.

In a further variation, the system determines the starting context by creating an initial context of zeros in response to the Get request packet being a first packet of a message. The system obtains the starting context from the cache in response to the Get request packet being a second or subsequent packet of the message.

In a further variation, the system processes the instruction in a respective cycle comprises by performing the following operations for each loop of the nested loops. The system determines whether a predetermined number of iterations can be performed in a respective loop. The system executes the predetermined number of iterations in the respective loop in response to determining that the predetermined number of iterations can be performed, which comprises tracking a number of bytes hypothetically transferred in a respective iteration. The system updates the loop counters and the byte offset based on executing the predetermined number of iterations. The system moves to a next loop for processing in a subsequent cycle in response to determining nested loops remaining to be processed.

In a further variation, the system determines whether the predetermined number of iterations can be performed in a respective loop by performing the following operations. The system determines that the predetermined number of iterations cannot be performed in the respective loop. The system determines whether a second number of iterations can be performed in the respective loop, the second number smaller than the predetermined number. The system executes the second number of iterations in the respective loop in response to determining that the second number of iterations can be performed. The system updates the loop counters and the byte offset based on executing the second number of iterations.

In a further variation, the system determines whether the predetermined number of iterations can be performed in a respective loop based on at least one of: the predetermined number or more of iterations remaining in the respective loop; processing the predetermined number of elements in the respective loop in response to the byte count not exceeding the size of the payload associated with the Get request packet; whether the data elements in the respective loop are byte-masked; or whether the final data element in the respective loop is a partial element.

In a further variation, the system obtains and stores the ending context in a number of hardware clock cycles less than a number of iterations of the nested loops. Subsequent to storing the starting context in the hardware table: the system receives the Get response packet corresponding to the previously received Get request packet; and the system processes the Get response packet by accessing the starting context previously stored in the hardware table.

Another aspect provides a computer system or a network device comprising at least one processing resource and a storage device (e.g., circuitry) storing instructions which when executed by the at least one processing resource comprises the instructions to perform the operations described herein. The instructions are to receive an instruction corresponding to a Get request packet of a message, wherein the instruction indicates a type of pattern associated with DMA write operations. The instructions are further to determine a descriptor and a starting context associated with the Get request packet in response to the type of pattern indicating nested loops associated with a multi-dimensional array structure, wherein the descriptor defines a direct memory access (DMA) scatter operation based on the nested loops. The instructions are further to provide access to the starting context in response to processing a Get response packet corresponding to the Get request packet by storing the starting context in a hardware table. The instructions are further to process the instruction in cycles until a byte count is equal to or greater than a size of a payload associated with the Get request packet, wherein the byte count comprises a number of bytes hypothetically transferred while processing the instruction and wherein processing the instruction in cycles comprises updating loop counters and a byte offset associated with iterating through the nested loops. The instructions are further to obtain, based on the processed instruction, an ending context comprising the updated loop counters and byte offset. The instructions are further to store the ending context in a cache as the starting context for a next instruction of a same message. The computer system or network device may include a content-processing system which includes the above-described instructions and instructions to perform the operations described herein, including in relation to: the architecture of FIG. 1; the communications, operations, and pseudocode of FIGS. 3A-D; the operations depicted in the flowcharts of FIGS. 4A and 4B; and the instructions of CRM 600 in FIG. 6.

Yet another aspect provides a non-transitory computer-readable storage medium storing instructions that when executed by a computer cause the computer to perform the method and operations described herein. The instructions are to receive an instruction corresponding to a Get request packet of a message, the instruction indicating a type of pattern associated with DMA write operations. The instructions are further to determine a descriptor and a starting context associated with the Get request packet in response to the type of pattern indicating nested loops associated with a multi-dimensional array structure, the descriptor defining a direct memory access (DMA) scatter operation based on the nested loops. The instructions are further to provide access to the starting context in response to processing a Get response packet corresponding to the Get request packet by storing the starting context in a hardware table. The instructions are further to process the instruction in cycles until a byte count is equal to or greater than a size of a payload associated with the Get request packet, the byte count comprising a number of bytes hypothetically transferred while processing the instruction, and processing the instruction in cycles comprising updating loop counters and a byte offset associated with iterating through the nested loops. The instructions are further to obtain, based on the processed instruction, an ending context comprising the updated loop counters and byte offset. The instructions are further to store the ending context in a cache as the starting context for a next instruction of a same message. The CRM can also store instructions for executing the operations described above in relation to: the architecture of FIG. 1; the communications, operations, and pseudocode of FIGS. 3A-D; the operations depicted in the flowcharts of FIGS. 4A and 4B; and the instructions of computer system 500 in FIG. 5.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:

receiving, by a direct memory access (DMA) scatter engine of a network interface card (NIC), an instruction corresponding to a Get request packet of a message, the instruction indicating a type of pattern associated with DMA write operations for a Get response payload;

determining a descriptor and a starting context associated with the Get request packet in response to the type of pattern indicating nested loops associated with a multi-dimensional array structure, the descriptor defining a DMA scatter operation based on the nested loops;

processing the instruction in cycles until a byte count is equal to or greater than a size of a payload associated with the Get request packet, the byte count comprising a number of bytes hypothetically transferred while processing the instruction, and processing the instruction in cycles comprising updating loop counters and a byte offset associated with iterating through the nested loops, wherein processing the instruction in cycles comprises executing a predetermined number of iterations in a respective loop of the nested loops and updating the byte count based on executing the predetermined number of iterations;

obtaining, based on the processed instruction, an ending context comprising the updated loop counters and byte offset;

storing the ending context in a cache as the starting context for a next instruction of a same message, wherein obtaining the ending context and storing the ending context in the cache are performed in a number of hardware clock cycles less than a number of iterations of the nested loops;

subsequent to storing the starting context in the hardware table, receiving the Get response packet corresponding to the Get request packet; and performing, by the DMA scatter engine, the DMA scatter operation for a payload of the Get response packet by accessing the starting context previously stored in the hardware table.

2. The method of claim 1, wherein the multi-dimensional array structure is associated with a number of elements in each dimension, a size of a block to be transferred, and a stride in each dimension.

3. The method of claim 1, further comprising:

determining that the type of pattern is associated with a reference to an input/output vector (IOVEC) with entries indicating addresses and lengths of data associated with the host memory;

refraining from storing the context and refraining from processing the instruction in cycles in response to the type of pattern being associated with the reference to the IOVEC; and creating and sending the starting context to a bypass queue for subsequent forwarding.

4. The method of claim 1, wherein determining the descriptor comprises:

obtaining the descriptor from a software-programmed table, a respective entry in the software-programmed table defining a DMA scatter operation.

5. The method of claim 1, wherein determining the starting context comprises:

creating an initial context of zeros in response to the Get request packet being a first packet of a message; and obtaining the starting context from the cache in response to the Get request packet being a second or subsequent packet of the message.

6. The method of claim 1, wherein processing the instruction in a respective cycle comprises, for each loop of the nested loops:

determining whether a predetermined number of iterations can be performed in a respective loop;

executing the predetermined number of iterations in the respective loop in response to determining that the predetermined number of iterations can be performed, wherein executing the predetermined number of iterations comprises tracking the loop counters and the number of bytes hypothetically transferred in a respective iteration;

updating the loop counters and the byte offset based on executing the predetermined number of iterations; and moving to a next loop for processing in a subsequent cycle in response to determining nested loops remaining to be processed.

7. The method of claim 6, wherein determining whether the predetermined number of iterations can be performed in a respective loop comprises:

determining that the predetermined number of iterations cannot be performed in the respective loop;

determining whether a second number of iterations can be performed in the respective loop, the second number smaller than the predetermined number;

executing the second number of iterations in the respective loop in response to determining that the second number of iterations can be performed; and updating the loop counters and the byte offset based on executing the second number of iterations.

8. The method of claim 6, wherein determining whether the predetermined number of iterations can be performed in a respective loop is based on at least one of:

the predetermined number or more of iterations remaining in the respective loop;

processing the predetermined number of elements in the respective loop in response to the byte count not exceeding the size of the payload associated with the Get request packet;

whether the data elements in the respective loop are byte-masked; or whether the final data element in the respective loop is a partial element.

9. A network device, comprising:

at least one processing resource; and a storage device storing instructions which when executed by the at least one processing resource comprise instructions to:

receive, by a direct memory access (DMA) scatter engine of a network interface card (NIC), an instruction corresponding to a Get request packet of a message, wherein the instruction indicates a type of pattern associated with DMA write operations for a Get response payload;

determine a descriptor and a starting context associated with the Get request packet in response to the type of pattern indicating nested loops associated with a multi-dimensional array structure, wherein the descriptor defines a direct memory access (DMA) scatter operation based on the nested loops;

store the starting context in a hardware table;

process the instruction in cycles until a byte count is equal to or greater than a size of a payload associated with the Get request packet, wherein the byte count comprises a number of bytes hypothetically transferred while processing the instruction and wherein processing the instruction in cycles comprises updating loop counters and a byte offset associated with iterating through the nested loops, wherein the instructions to process the instruction in cycles are further to execute a predetermined number of iterations in a respective loop of the nested loops and update the byte count based on executing the predetermined number of iterations;

obtain, based on the processed instruction, an ending context comprising the updated loop counters and byte offset;

store the ending context in a cache as the starting context for a next instruction of a same message, wherein the instructions to obtain the ending context and store the ending context in the cache are performed in a number of hardware clock cycles less than a number of iterations of the nested loops;

subsequent to storing the starting context in the hardware table, receive the Get response packet corresponding to the Get request packet; and perform, by the DMA scatter engine, the DMA scatter operation for a payload of the Get response packet by accessing the starting context previously stored in the hardware table.

10. The network device of claim 9, wherein the multi-dimensional array structure is associated with a number of elements in each dimension, a size of a block to be transferred, and a stride in each dimension.

11. The network device of claim 9, wherein the instructions are further to:

determine that the type of pattern in the received instruction indicates the nested loops associated with the multi-dimensional array structure;

determine that the received instruction is associated with a first message for which one or more same-message instructions are already stored in an entry in a tracker data structure; and enforce in-order processing of the received instruction and the one or more same-message instructions by storing the received instruction in the entry in the tracker data structure as a linked-list.

12. The network device of claim 9, wherein the instructions to determine the starting context are further to:

create an initial context of zeros in response to the Get request packet being a first packet of a message; and obtain the starting context from the cache in response to the Get request packet being a second or subsequent packet of the message.

13. The network device of claim 9, wherein the instructions to process the instruction in a respective cycle are further to, for each loop of the nested loops:

determine whether a predetermined number of iterations can be performed in a respective loop;

execute the predetermined number of iterations in the respective loop in response to determining that the predetermined number of iterations can be performed, wherein the instructions to execute the predetermined number of iterations are further to track the loop counters and the number of bytes hypothetically transferred in a respective iteration;

update the loop counters and the byte offset based on executing the predetermined number of iterations; and move to a next loop for processing in a subsequent cycle in response to determining nested loops remaining to be processed.

14. The network device of claim 13, wherein the instructions to determine whether the predetermined number of iterations can be performed in a respective loop are further to:

determine that the predetermined number of iterations cannot be performed in the respective loop;

determine whether a second number of iterations can be performed in the respective loop, wherein the second number is smaller than the predetermined number;

execute the second number of iterations in the respective loop in response to determining that the second number of iterations can be performed, wherein the instructions to execute the second number of iterations are further to track a number of bytes hypothetically transferred in a respective iteration; and update the loop counters and the byte offset based on executing the second number of iterations.

15. The network device of claim 13, wherein the instructions to determine whether the predetermined number of iterations can be performed in a respective loop is based on at least one of:

the predetermined number or more of iterations remaining in the respective loop;

processing the predetermined number of elements in the respective loop in response to the byte count not exceeding the size of the payload associated with the Get request packet;

whether the data elements in the respective loop are byte-masked; or whether the final data element in the respective loop is a partial element.

16. A non-transitory computer-readable medium storing instructions to:

receive an instruction corresponding to a Get request packet of a message, the instruction indicating a type of pattern associated with direct memory access (DMA) write operations;

determine a descriptor and a starting context associated with the Get request packet in response to the type of pattern indicating nested loops associated with a multi-dimensional array structure, the descriptor defining a direct memory access (DMA) scatter operation based on the nested loops;

provide access to the starting context in response to processing a Get response packet corresponding to the Get request packet by storing the starting context in a hardware table;

process the instruction in cycles until a byte count is equal to or greater than a size of a payload associated with the Get request packet, the byte count comprising a number of bytes hypothetically transferred while processing the instruction, and processing the instruction in cycles comprising updating loop counters and a byte offset associated with iterating through the nested loops;

obtain, based on the processed instruction, an ending context comprising the updated loop counters and byte offset; and store the ending context in a cache as the starting context for a next instruction of a same message.

17. The non-transitory computer-readable medium of claim 16, wherein the instructions to process the instruction in a respective cycle are further to, for each loop of the nested loops:

determine whether a predetermined number of iterations can be performed in a respective loop;

execute the predetermined number of iterations in the respective loop in response to determining that the predetermined number of iterations can be performed, the instructions to execute the predetermined number of iterations further to track a number of bytes hypothetically transferred in a respective iteration;

update the loop counters and the byte offset based on the execution of the predetermined number of iterations; and move to a next loop for processing in a subsequent cycle in response to determining nested loops remaining to be processed.

18. The non-transitory computer-readable medium of claim 17, wherein the instructions to determine whether the predetermined number of iterations can be performed in a respective loop are further to:

determine that the predetermined number of iterations cannot be performed in the respective loop;

determine whether a second number of iterations can be performed in the respective loop, wherein the second number is smaller than the predetermined number;

execute the second number of iterations in the respective loop in response to determining that the second number of iterations can be performed, the instructions to execute the second number of iterations further to track a number of bytes hypothetically transferred in a respective iteration; and update the loop counters and the byte offset based on the execution of the second number of iterations.

* * * * *